US009887834B1

(12) United States Patent
Molaro

(10) Patent No.: US 9,887,834 B1
(45) Date of Patent: Feb. 6, 2018

(54) DATA DEDUPLICATION AND COMPRESSION EVALUATION METHODS AND SYSTEMS

(71) Applicant: Citigroup Technology, Inc., Weehawken, NJ (US)

(72) Inventor: Donald Joseph Molaro, Cupertino, CA (US)

(73) Assignee: CITIGROUP TECHNOLOGY, INC., Weehawken, NJ (US)

(*) Notice: Subject to any disclaimer, the term of this patent is extended or adjusted under 35 U.S.C. 154(b) by 146 days.

(21) Appl. No.: 14/723,245

(22) Filed: May 27, 2015

(51) Int. Cl.
H04L 9/06 (2006.01)
G06F 3/06 (2006.01)

(52) U.S. Cl.
CPC .......... *H04L 9/0643* (2013.01); *G06F 3/0608* (2013.01); *G06F 3/0641* (2013.01); *G06F 3/0673* (2013.01); *H04L 9/0662* (2013.01)

(58) Field of Classification Search
CPC ....... H04L 9/0643; H04L 9/0662; H04L 9/00; H04L 9/32–9/3297; G06F 3/0641; G06F 3/0673; G06F 3/0608; G06F 15/16–15/18; G06F 21/00
USPC .......................................................... 380/46
See application file for complete search history.

(56) References Cited

U.S. PATENT DOCUMENTS

| 9,141,554 B1* | 9/2015 | Candelaria .......... G06F 12/0864 |
| 2006/0067527 A1* | 3/2006 | Urivskiy ................. G06F 7/588 380/46 |
| 2007/0081668 A1 | 4/2007 | McGrew et al. |
| 2009/0048997 A1* | 2/2009 | Manickam .............. G06F 21/62 706/47 |
| 2014/0114936 A1* | 4/2014 | Araki ..................... G06F 3/0608 707/693 |
| 2014/0337640 A1 | 11/2014 | Sharma et al. |

OTHER PUBLICATIONS

Published: Ritter, T. 1990. Substitution Cipher with Pseudo-Random Shuffling: The Dynamic Substitution Combiner. Cryptologia. 14(4): 289-303.*
Ritter, T. 1990. Substitution Cipher with Pseudo-Random Shuffling: The Dynamic Substitution Combiner. Cryptologia. 14(4): 289-303.*
Terry Ritter, Published: Ritter, T. 1990. Substitution Cipher with Pseudo-Random Shuffling: The Dynamic Substitution Combiner. Cryptologia. 14(4): 289-303.*
Ritter, "Substitution Cipher with Pseudo-Random Shuffling: The Dynamic Substitution Combiner", Cryptologia, 1990, vol. 14, No. 4, pp. 289-303, http://www.ciphersbyritter.com/ARTS/DYNSUB2.HTM.

* cited by examiner

*Primary Examiner* — Ashok Patel
*Assistant Examiner* — Quazi Farooqui
(74) *Attorney, Agent, or Firm* — John M. Harrington, Esq.; Johnson, Marcou & Isaacs, LLC

(57) ABSTRACT

Deduplication and compression evaluation methods and systems involve one or more processors generating a hash value for each block of data in a block storage device and creating a random substitution cypher using the respective hash values for each of said blocks of data as seed values to a random number generator. Thereafter, positions of run lengths for each of said blocks of data are randomly shuffled by the one or more processors with no run lengths having identical run length values disposed adjacent one another, a synthetic version of each of said blocks of data is generated using the substituted, shuffled, run lengths.

17 Claims, 3 Drawing Sheets

DATA DEDUPLICATION AND COMPRESSION EVALUATION METHODS AND SYSTEMS

FIELD OF THE INVENTION

The present invention relates generally to the field of data storage devices and more particularly to methods and systems for generating "synthetic" data sets for evaluating deduplication and compression systems for data storage devices.

BACKGROUND OF THE INVENTION

Data deduplication may be characterized as a specialized data compression technique for eliminating duplicate copies of repeating data, thereby reducing the amount of storage needed for a given quantity of data. A current problem faced by entities that store data is the complicated, time-consuming process that is typically involved in evaluating and comparing vendor designs of deduplication and compression systems employed in data storage. Another problem currently facing such entities is the need to protect its confidential information, as well as the legal duty of such entities to protect personally identifiable information (PII) stored in its data storage systems from exposure outside the entity.

The types of systems that such entities may be interested in evaluating are typically data storage systems designed to store large amounts of data. Such data storage systems may be referred to in the industry as block storage devices. Such block storage devices may include, for example, both disc-storage systems and flash-based storage systems. In a block storage device, each individual data element may have a particular size, such as 4096 bytes, and each individual block of data stored on that storage device is accessible by a unique address that may be referred to as a logical block address (LBA)

Typically, an entity, such as a financial institution, health care organization, or government agency may not be permitted to take copies of data that contains PII outside of the entity. Therefore, it is typically not possible for such entities to allow use of copies of data at a vendor site or in a laboratory environment that is not controlled by the entity for evaluation of the vendor's system designs. A traditional approach to this problem has been for an entity to engage with a systems vendor and have the vendor provide its product to the entity for evaluation. The entity may then install the vendor's product in one of the entity's own facilities and perform an evaluation of the vendor's system design by and under the entity's control. That traditional evaluation process may typically take up to six or more months to complete.

There is a present need for methods and systems that enable rapid evaluation of potential vendor designs of deduplication and compression systems and that ensure an apples-to-apples comparison of competing designs. There is presently a further need for methods and systems that assure that the results of tests to evaluate those designs are valid against one another and that they do not expose any PII or confidential information of entities that is stored in the systems of such entities.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the methods described herein.

Thus, embodiments of the invention provide methods and systems for generating "synthetic" data sets for evaluating deduplication and compression systems for data storage devices that involve, for example, generating, by one or more processors coupled to memory, a hash value for each block of data in a block storage device; creating, likewise by the one or more processors, a random substitution cypher using the respective hash values for each of said blocks of data as seed values to a random number generator; randomly shuffling, also by the one or more processors, positions of run lengths for each of said blocks of data with no run lengths having identical run length values disposed adjacent one another; and generating, by the one or more processors, a synthetic version of each of said blocks of data using the substituted, shuffled, run lengths.

Other aspects of embodiments of the invention, may involve, for example, mapping the respective hash values to identifiers for corresponding blocks of data. In other aspects, mapping the respective hash values to identifiers for corresponding blocks of data may involve, for example, mapping the respective hash values to the identifiers for the corresponding blocks of data in a same order and frequency as the blocks of data in the block storage device. In further aspects, mapping the respective hash values to identifiers for corresponding blocks of data may involve, for example, mapping a same hash value for multiple corresponding blocks of data to identifiers for the multiple corresponding blocks of data as a group. In additional aspects, the block storage device may comprise, for example, a disc storage device and/or a flash array storage device.

In further aspects of embodiments of the invention, generating the synthetic version of each of said blocks of data using the substituted, shuffled, run lengths may involve, for example, generating a synthetic version of the block storage device using the synthetic version of each of said blocks of data. In still further aspects, generating the synthetic version of each of said blocks of data using the substituted, shuffled, run lengths may involve, for example, generating the synthetic version of each of said blocks of data having a same entropy value as an entropy value of the blocks of data in the block storage device. In other aspects, generating the synthetic version of each of said blocks of data having a same entropy value as an entropy value of the blocks of data in the block storage device may involve, for example, generating the synthetic version of each of said blocks of data having the same randomness as the blocks of data in the block storage device.

In additional aspects of embodiments of the invention, generating the synthetic version of each of said blocks of data using the substituted, shuffled, run lengths may involve, for example, generating the synthetic version of each of said blocks of data having a same compressibility as the blocks of data in the block storage device. In still further aspects, generating the synthetic version of each of said blocks of data using the substituted, shuffled, run lengths may involve, for example, generating the synthetic version of each of said blocks of data having a same run length histogram as a run length histogram for the blocks of data in the block storage device.

Additional aspects of embodiments of the invention may involve, for example, creating a run length histogram based on run length values and frequency of run lengths for each of said blocks of data in the block storage device. Further aspects may involve, for example, creating a run length histogram based on run length values and frequency of run lengths for said synthetic version of each of said synthetic blocks of data. Other aspects may involve, for example, comparing the run length histogram for said blocks of data in the block storage device to said run length histogram for said synthetic version of said blocks of data. Still other aspects may involve, for example, determining an entropy value for the blocks of data in the block storage device and an entropy value for said synthetic version of said blocks of data. Still further aspects may involve, for example, comparing the entropy values for the blocks of data in the block storage device to the entropy value for said synthetic version of said blocks of data.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Figure 1:
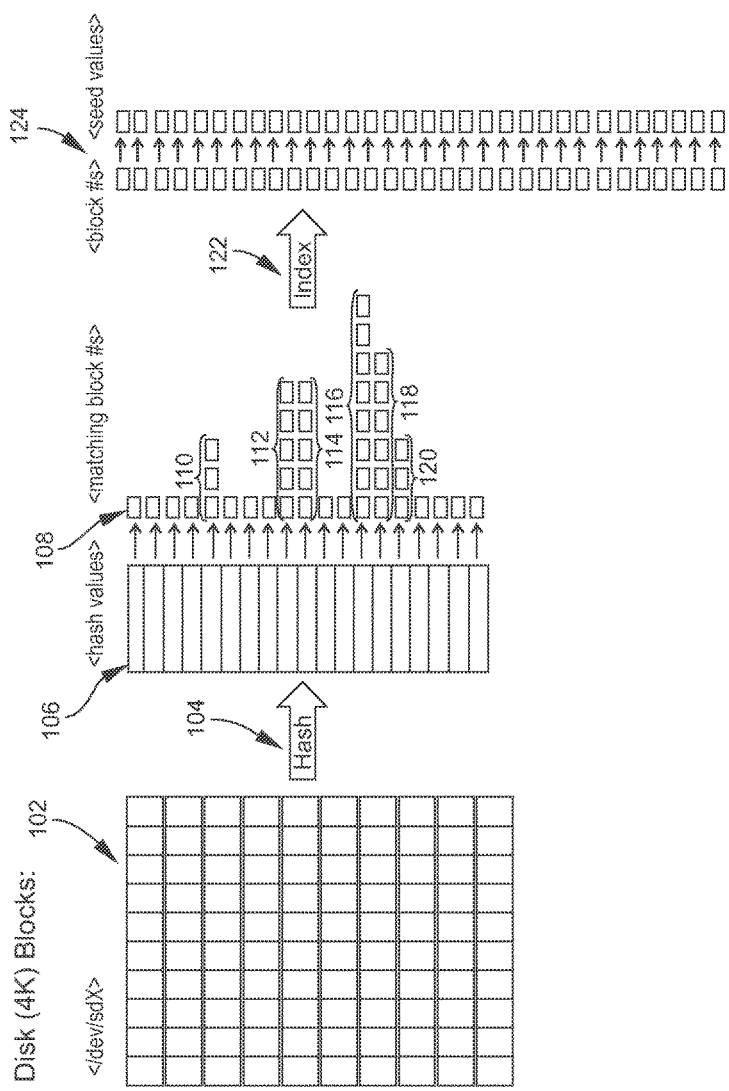
FIG. 1 is a pictographic representation of an example of a process of analyzing a block data storage device and generating a block index to (hash) seed values according to embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provides methods and systems for generating "synthetic" data sets which have the same deduplication characteristics as an entity's existing data but which contain no confidential data. A "synthetic" data set may be an anonymized data set that matches the real data in its theoretical ability to be dedeuplicated and/or compressed. Such "synthetic" data sets may be used to quantify the potential effectiveness of deduplication and compression of the entity's data using one or more deduplication and compression systems by one or more vendors of such systems at the vendors' own facilities with minimal involvement of the entity and without exposing any confidential data of the entity.

Thus, embodiments of the invention address a unique problem of evaluating deduplication and compression systems outside an entity without exposing the entity's stored data. The solution provided by embodiments of the invention is inextricably tied to the technology in which the problem arose. It assures that evaluations are performed quickly and efficiently without exposing PII or confidential information outside such an entity that is under an obligation to protect such information, while at the same time assuring that the results of tests to evaluate such systems are accurate and valid against one another other. Further, it improves the technology by allowing such evaluations which would otherwise be impossible.

Typically, the type of block storage system proposed for evaluation by an entity, such as a financial institution, health care provider, government agency or other institution that stores and processes data, may be a solid state based storage systems because of the ability of such systems to deduplicate and compress data, which may be a key feature in a financial institution, health care provider, government agency or other institution that stores and processes data, environment and for which solid state storage may be particularly well adapted. However, it is to be understood that embodiments of the invention are not limited to use with such systems but may be employed with any type of block storage system that involves deduplication and compression of data.

As a somewhat oversimplified example of the deduplication process, assume that employee A of an entity sends a document electronically to employee B within the same entity, and both employees then store their respective copies of the document on a block storage device of the entity. Thus, employee A may perceive that she has a copy of the document, and employee B may likewise perceive that she also has a copy of the document. However, in the background, the block storage system of the entity may detect identical blocks of data within the data that makes up the document, and instead of storing two separate copies of the document, the block storage system may simply provide a reference to the document such that employees A and B share the same copy of the document.

A typical mechanism for deduplication may be hashing using one or more hash algorithms. An example of a hash algorithm that may be employed for that purpose may be the MD5 message-digest algorithm. However, there are numerous hashing algorithms that would be suitable to use in the algorithm including but not limited to: MD5, SHA-1, BLAKE, Skein etc. It is to be understood that embodiments of the invention are not limited to any particular deduplication mechanism or any particular hash algorithm. For example, a block storage system may calculate a hash across a block of stored data, such as a block of data containing 4096 bytes, whereupon the resulting hash would obviously be much shorter than 4096 bytes. If another block of similarly hashed data is identified by the system as having the same hash, there is a reasonable expectation that those two blocks of stored data are identical. Embodiments of the invention may exploit that aspect of deduplication.

A feature of embodiments of the invention may relate to analysis of a vendor's system to evaluate its ability to deduplicate data. Typically, deduplication on such systems may be performed, for example, on 4096-bytes (4K) block alignments of data. It is to be understood, however that such systems may perform deduplication, for example, on larger blocks of data, such as 8K (8192 bytes) blocks of data, or on smaller blocks, or on blocks of variable sizes. The principle is the same regardless of the size of the data blocks.

In a deduplication aspect of embodiments of the invention, each 4K block of data in a block device may be examined, and a hash value, such as an MD5 hash value, may be calculated across each block of data. The hash values may then be placed into an index table that maps each hash value to a matching block of data. Thus, the table of hash values may reference obfuscated block definitions of each block of data which contain no PII but which are in the same order and frequency as in the underlying blocks of data.

It will be appreciated that a large block storage device may have a significantly large number of blocks of data that are identical to one another, for example, because multiple copies of the same data may be stored in the database, or blocks may quite often be zero because they have not yet been used. As noted, the index table presents a map of hash values to block numbers in the same order and frequency as in the underlying blocks of data. Embodiments of the invention may next invert the index which may involve, for example, walking or stepping through the index using the hash of each block to determine which blocks are identical.

A list of the block numbers may then be generated to use the hash values as seed values to a random number generator. Those seed values to the random number generator may then be employed to generate a "synthetic" version of each block that has the same pattern as the block device but contains only random data. This deduplication analysis aspect of embodiments of the invention provides an effective tool to evaluate the ability of an underlying data storage system to deduplicate blocks of data, because it enables generation of a block device that has the same "synthetic" version (i.e., same pattern of blocks) as the original stored data but contains no confidential data.

Another feature of embodiments of the invention may relate, for example, to evaluating the ability of a vendor's system to compress data as it is stored or written to a block storage device. This feature may include, for example, an ability to generate data that has the same compressibility as the original data while nevertheless obscuring or obfuscating the PII associated with the original data. In embodiments of the invention, the compressibility of the data may be hypothesized to be dependent on factors, such as a randomness of the data sets and a frequency of run lengths within the data sets as represented, for example, by a data histogram. A measure of randomness of data in a data set may be the entropy of the data set. Thus, in embodiments of the invention, it may be further hypothesized that in order to preserve the compressibility of the original data in a "synthetic" version of the data, the entropy and the data histogram of the "synthetic" data must be substantially the same as those of the original data.

An aspect of this feature may involve, for example, generating a "synthetic" data set that has a level of entropy and a data histogram that is equivalent to that of the original data set. It is to be understood that there are many different methods of determining entropy, including many different algorithms for computing entropy values. For example, a common and well-known measure of entropy is Shannon entropy. It is to be further understood that although embodiments of the invention may be described herein with reference to Shannon entropy, embodiments of the invention may employ any other measure of entropy.

Regarding the data histogram aspect, as data is stored, there may typically be runs of the same bits of a byte. An example of a trivial case may be a block of 4096 bytes of data consisting of all zeros, which means the block has only a single run length, for example, of 4096 bytes that contain only zeros. Another trivial case example may be a block of 4096 bytes of data of which the first half consists only of fives and the second half consists only of zeroes, which means the block has two run lengths, one with 2048 bytes that contain only fives and another with 2048 bytes that contain only zeros.

The data in a block of data may be represented as a list of run lengths, and that list of run lengths and the frequency of those run lengths may be used, for example, to create a bar graph or histogram. The resulting histogram may serve, for example, as a signature of that block of data. A run length may be characterized from a mathematical perspective as a tuple that specifies where the run length begins and ends and the data that it contains. In the foregoing trivial case of a block of 4096 bytes of data containing all zeros, the run length may begin at zero, end at 4096, and contain a single value.

If one has access to a sufficient number of tuples for a particular block of data, it may be possible to reconstruct the data in that block, as long as the tuples are available in the correct order. A possible solution in that case may be to analyze data blocks, construct histograms in each case and then simply apply a substitution cypher to the data, such as changing all zeros to ones, fives, threes, or the like. However, that suggestion would likely be susceptible to a cryptographic attack referred to as frequency analysis.

A simple version of cryptographic attack in that case may involve, for example, referring to the statistical frequency of the occurrence of particular letters in the language of text represented by the data in the data block. For example, it is known that the letter E is the most commonly occurring letter in the English language. Thus, if one knows that the data in a data block represents text, it would be possible to determine by frequency analysis of the bytes in the data block, regardless of the particular values, that the most commonly occurring value almost certainly represented the letter E. Repeating that process, for example, using the next most commonly occurring letters may enable one to effectively reconstruct the text represented by the data block.

The foregoing illustrates an example of the vulnerability of a substitution cypher to a very simple cryptographic attack. Embodiments of the invention reduce this vulnerability by not only employing a substitution cypher but also scrambling or shuffling the order of the data block run lengths. Therefore, even if an attacker were able to perform such a frequency analysis of the bytes in the data block and identify letters represented by particular values, the resulting text would be unintelligible, because of the random shuffling of the run lengths. In other words, while the attacker may be able to see that the data block represents text, it would be difficult for the attacker to make any sense of the text, and PII in the data would be protected from disclosure.

Further, in order to preclude a possibility of the random shuffling of run lengths resulting in inadvertently placing run lengths having the same value adjacent one another and thereby unintentionally extending run lengths, embodiments of the invention explicitly preclude placing same value run lengths adjacent one another when the random shuffling of run lengths is performed. That explicit preclusion guarantees that the data in the data block, including any PII, is obfuscated in that it has different values and different positions, while at the same time retaining the same degree of compressibility and randomness as measured, for example, by its entropy value, such as its Shannon entropy value.

Embodiments of the invention may involve, for example, manipulation of two aspects of run lengths to create a new histogram. A first aspect that may be manipulated is the positions of the run lengths and a second aspect that may be manipulated is the values of those run lengths. Generation of the histogram may result, for example, in a list of run lengths that are the same but occupy different positions in the data block and have different values associated with them. That histogram may then be used to generate a "synthetic" data block that has the same entropy and therefore the same compressibility as the original data block.

As previously noted, in a trivial case example, a block of 4096 bytes may consist of all zeros, which means the block has only a single run length of 4096 bytes that contains only zeros. In another trivial case example, a block of 4096 bytes consisting entirely of random data may have 4096 different run lengths. However, while it is possible to generate a histogram of a block of 4096 bytes consisting entirely of random data, the data stored in a typical block storage system is generally very self-similar, so that situation is not likely to occur as a practical matter. As previously noted, while the examples herein relate primarily to blocks of 4096 bytes, embodiments of the invention are not limited to such block sizes and may relate to data blocks of any other sizes.

It is to be understood that embodiments or the invention are independent of the particular compression algorithm that may be used to compress the data. For example, there are currently many types of data compression algorithms available. Typically, these types of algorithms may be based upon what is commonly implemented in a program known as PKZIP, which is a variant of run-length encoding. In embodiments of the invention, as illustrated by measuring the entropy of the data, the compressibility of the data is independent of the manner in which the data is compressed. While there may be specific compression algorithms in existence that perform, for example, by basing compression on knowledge of the underlying data, such specialized compression algorithms are not generally employed in general-purpose data storage systems, such as discussed herein.

In embodiments of the invention, when random data is substituted in each individual block, each of the block signatures becomes its own one-time pad, and one-time pads are generally considered to be unbreakable. FIG. 1 is a pictographic representation of an example of a process of analyzing a block data storage device and generating a block index to (hash) seed values according to embodiments of the invention. Referring to FIG. 1, the notation </dev/sdX> may represent, for example, a name or identifier of a block storage device. A particular data storage system may have any number of such devices, in which case each device may have its own device name or identifier, for example, with the X replaced by some other letter or numeral. The grid 102 of the pictograph may represent, for example, the 4096 blocks that make up the particular block storage device. Again, it is to be understood that 4096 blocks is illustrative only and that the storage device may include any other number of blocks.

Referring further to FIG. 1, at 104, a hash value may be created for each of the blocks in the grid 102, as illustrated by the list 106 of hash values for each block. Thereafter, each hash value for each of the blocks in the grid 102, as illustrated by the list 106 of hash values for each block, may be matched to its corresponding block as illustrated in the corresponding list of blocks 108, each of which blocks has a logical block address or block number. Thus, each hash value, as illustrated in the list 106, that was catenated across the block, as represented by the grid 102, may be mapped to the corresponding or matching block number, as illustrated in the list 108 of matching block numbers, and in in the case of multiple blocks having identical hash values, to multiple block numbers.

For example, a hash value, as illustrated in the list 106, that is identical for multiple blocks may be mapped to multiple block numbers, such as groups of block numbers 110, 112, 114, 116, 118, and 120. Assume, for example, that the group 110 of three block numbers are blocks numbered 5, 17 and 350. Thus, the blocks numbered 5, 17, and 350 have identical hash values, which indicates that each of those blocks has the same content. Likewise, groups of block numbers 112, 114, 116, 118, and 120 represent other sets of multiple blocks in which each block in a group has a hash value that is identical to the hash values of the other blocks in the group, indicating that the blocks in a particular group all have the same content.

Referring again to FIG. 1, at 122, an indexing process is performed that involves, for example, walking the list of hash values 106 and matching block numbers to seed values generated from the corresponding block numbers, as illustrated in index 124. Assume, for example, that the first hash value in the list of hash values 106 is mapped to matching a block that is numbered 10. Thus, the tenth entry in the index 124 may then map to a seed value generated from the hash value associated with the block numbered 10. Further, in the earlier example of the group 110 of three block numbered 5, 17 and 350 that have identical hash values, those blocks at the fifth, 17th, and 350th positions in the index 124 all map to the same seed value generated from the same hash value in index 124.

Figure 2:
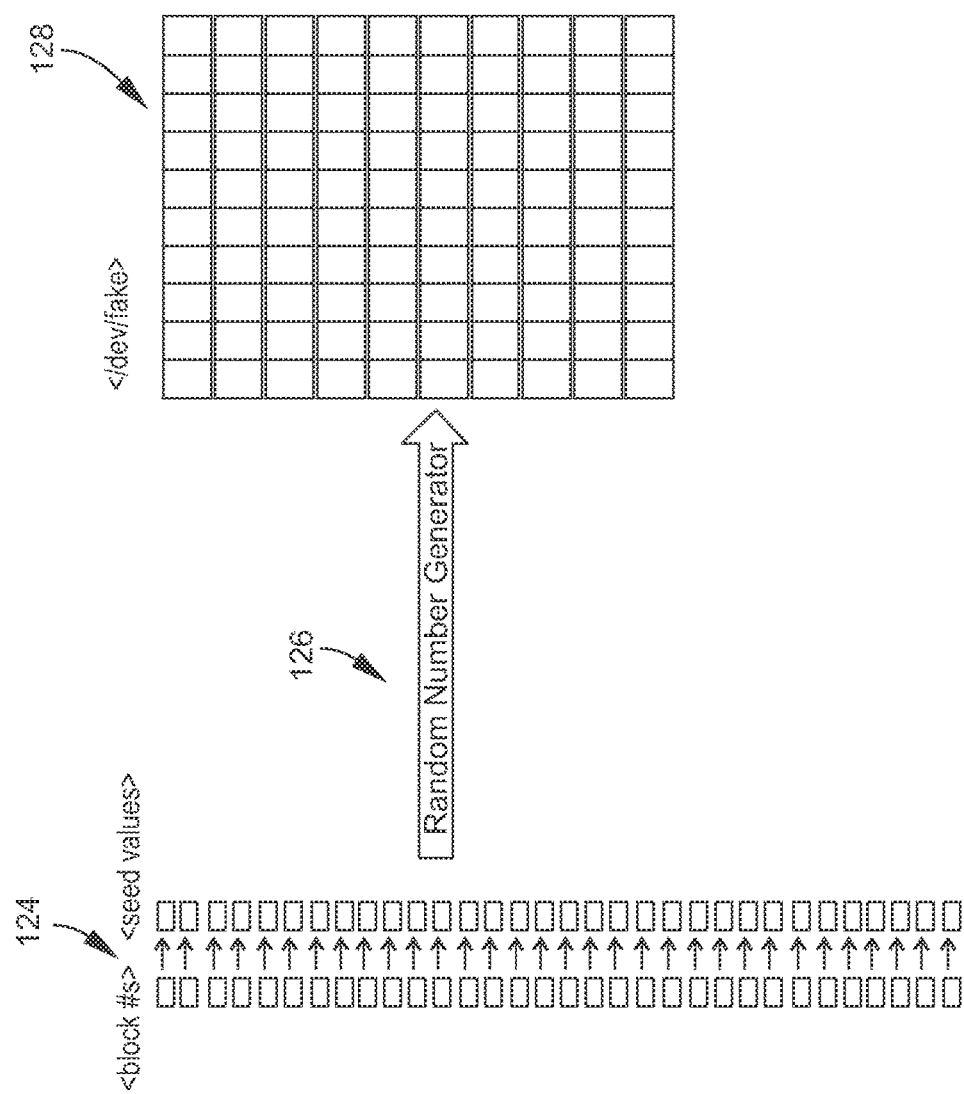
FIG. 2 is a pictographic representation of an example of the process for embodiments of the invention of generating a "synthetic" version of the original data block of FIG. 1 with the same pattern of blocks as the original block device but with random data.

FIG. 2 is a pictographic representation of an example of the process for embodiments of the invention of generating a "synthetic" version of the original data block of FIG. 1 with the same pattern of blocks as the original block device but with random data. Returning again to the example of the group 110 shown in FIG. 1 of three block numbers 5, 17 and 350 that have identical hash values, as noted above, in index 124, the same seed value appears at the fifth, 17th and 350th places in the list of block numbers 124. Therefore, that same seed value is used at 126 to seed a random number generator for each of the blocks numbered 5, 17 and 350, such that the data in each those blocks is also identical.

Repeating the process of seeding the random generator with the seed values for each block number to generate "synthetic" data may result in a perfect image and pattern of the original block device, but containing different data from the original blocks. Using the "synthetic" data, embodiments of the invention enable evaluating a particular deduplication system by a vendor outside an entity without exposing any PII or other confidential information of an entity. In other words, while the example of the blocks of "synthetic" data represented by grid 128 in FIG. 2 is an image with the same pattern as the example of the blocks represented by grid 102 in FIG. 1, the blocks of "synthetic" data represented in FIG. 2 themselves contain no PII.

Figure 3:
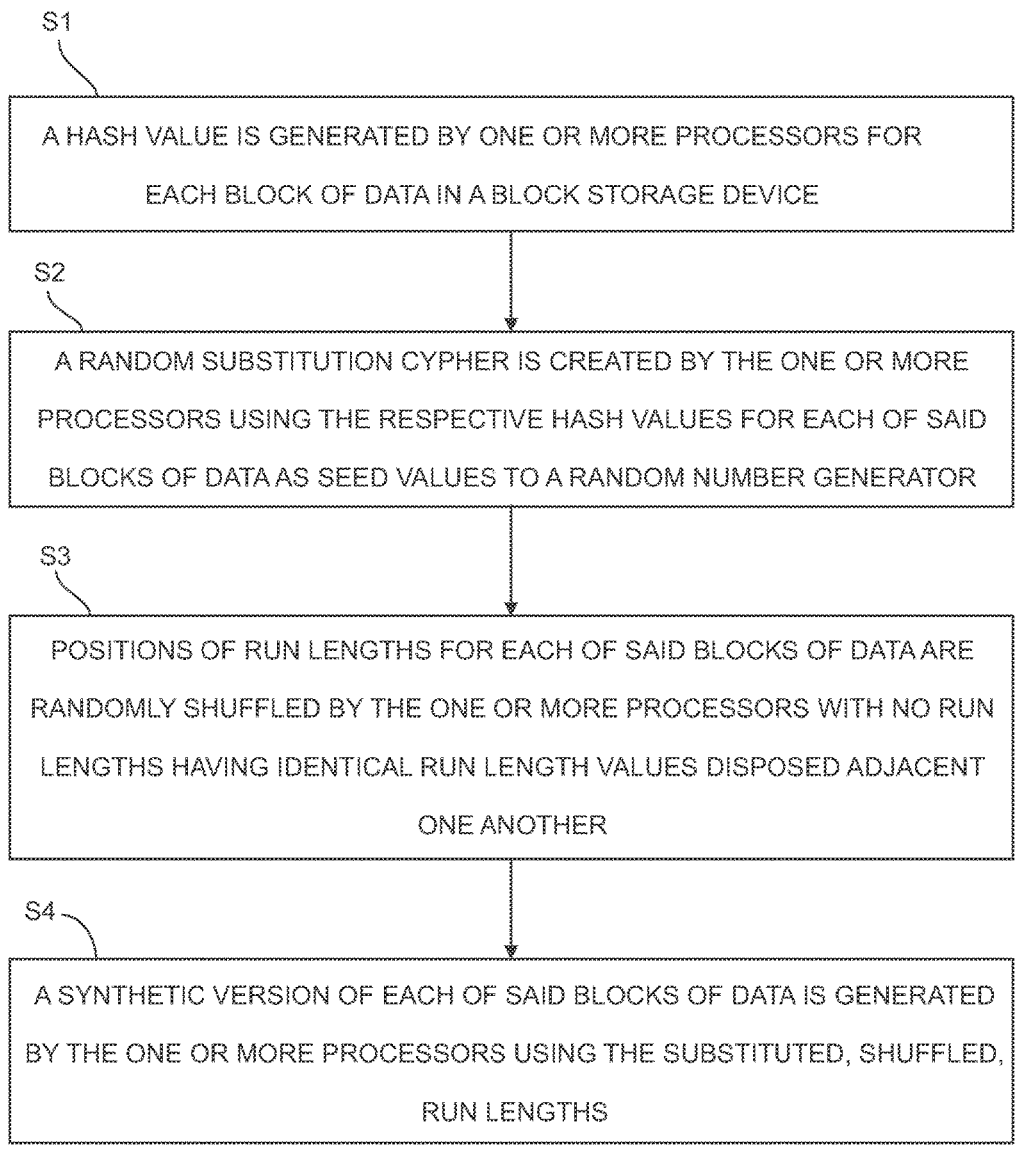
FIG. 3 is a flow chart that illustrates an example of the process for embodiments of the invention of generating a "synthetic" version of obfuscated blocks of data from blocks of data in a block storage device having a same randomness and compressibility as the blocks of data in the block storage device.

FIG. 3 is a flow chart that illustrates an example of the process for embodiments of the invention of generating a "synthetic" version of obfuscated blocks of data from blocks of data in a block storage device having a same randomness and compressibility as the blocks of data in the block storage device. Referring to FIG. 3, at S1, a hash value is generated by one or more processors for each block of data in a block storage device. At S2, a random substitution cypher is created by the one or more processors using the respective hash values for each of said blocks of data as seed values to a random number generator. At S3, positions of run lengths for each of said blocks of data are randomly shuffled by the one or more processors with no run lengths having identical run length values disposed adjacent one another. At S4, a "synthetic" version of each of said blocks of data is generated by the one or more processors using the substituted, shuffled, run lengths.

In order to confirm that embodiments of the invention work equally well for compression analysis, a first test was performed in which run lengths were generated for an example using a simple block device having 16 unique bytes. It is to be understood that such an example block device represents a simple test case to confirm that substituting the positions and the values of the blocks results in no change in the compressibility of the data and in no way limits a scope of embodiments of the invention. Since the 16 bytes were unique, the run length values were each 1 and the run lengths extended, for example, from position 0 to position 1, from position 1 to position 2, from position 2 to position 3, and so on up to from position 15 to position 16. For each of the 16 unique blocks in the system, a Shannon entropy value was calculated, and it was determined that 4 bits per symbol (or byte), or a total of 64 bits was needed for an ideal encoding of the 16 unique blocks.

Thereafter, a run-length histogram of the block was generated, and a random cypher substitution was performed on the histogram values. The run length positions were then randomly shuffled with a rule not to place same valued run lengths adjacent one another. Next, the substituted, shuffled, run lengths were used to generate a "synthetic" data block. The Shannon entropy value was then calculated for the "synthetic' data block and found to be identical to the Shannon entropy value that was calculated for the original data block (i.e., 4 bits per symbol with an ideal encoding of 64 bits). Likewise, a run-length histogram of the "synthetic" data block was generated and found to be similar to the histogram that was generated for the original data block. The foregoing first test represents a trivial case which confirms that substituting the positions and the values of the blocks results in no change in the compressibility of the data.

A second test was also performed that is more typical of various different run lengths that may be present in a data storage device likewise having, for example, 16 bytes. It is likewise to be understood that such a simple example block device represents a simple test case to confirm that substituting the positions and the values of the blocks results in no change in the compressibility of the data and in no way limits a scope of embodiments of the invention. In the second case, for example, the first run length value was 3 and its run length extended from position 0 to position 3, the second run length value was 4 and its run length extended from position 3 to position 7, the third run length value was 1 and its run length extended from position 7 to position 8, the fourth run length value was 3 and its run length extended from position 8 to position 11, the fifth run length value was 2 and its run length extended from position 11 to position 13, the sixth run length value was 3 and its run length extended from position 13 to position 16.

In the second test, a Shannon entropy value was calculated for each of the blocks in the system, and it was determined that 1.59 bits per symbol (or byte), or a total of 6.36 bits was needed for an ideal encoding of the 16 blocks. Thereafter, a run-length histogram of the block was generated, a random cypher substitution was performed on the histogram values, and the run length positions were randomly shuffled with a rule not to place same valued run lengths adjacent one another. Next, the substituted, shuffled, run lengths were used to generate a "synthetic" data block, and the Shannon entropy value was calculated for the "synthetic' data block.

As in the first test, the Shannon entropy value for the "synthetic" data block was determined and found to be identical to the Shannon entropy value that was determined for the original data block (i.e., 1.59 bits per symbol with an ideal encoding of 6.36 bits). Also as in the first test, a run-length histogram of the "synthetic" data block was generated and found to be similar to the histogram that was generated for the original data block. Thus, the test representing a case more typical of the type of behavior that may be seen with stored data confirms that substituting the positions and the values of the blocks results in no change in the compressibility of the data.

It is to be understood that the application code for embodiments of the invention may be built, for example, in multiple layers using any suitable coding language to allow its flexibility. It is to be further understood that embodiments of the invention may be implemented as processes of a computer program product, each process of which is operable on one or more processors either alone on a single physical platform, such as a personal computer, or across a plurality of devices, connected by a system or network, including networks such as the Internet, an intranet, a WAN, a LAN, a cellular network, or any other suitable communication network.

Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public communication network, or other transmission device or channel, both wired or wireless. Such instructions may comprise code from any suitable computer programming language. Embodiments of the invention may also employ one or more special-purpose programming languages, such as Structured Query Language designed, for example, for managing data held in a relational database management system, or for stream processing in a relational data stream management system.

It is to be further understood that client devices that may be employed by embodiments of the invention may also comprise a number of external or internal devices, such as a mouse, a CD-ROM, DVD, keyboard, display, or other input or output devices. In general, such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method comprising:
generating, by one or more processors coupled to memory, a hash value for each block of data in a block storage device storing confidential data, each of said blocks of data in the block storage device having predetermined deduplication characteristics of randomness and compressibility;
creating, by the one or more processors, a random substitution cypher using the respective hash values for each of said blocks of data as seed values to a random number generator;
randomly shuffling, by the one or more processors, positions of run lengths for each of said blocks of data with no run lengths having identical run length values disposed adjacent one another; and
generating, by the one or more processors, a synthetic version of each of said blocks of data using the substituted, shuffled, run lengths, said synthetic version of each of said blocks of data containing no confidential data and only random non-confidential data that is different data than said confidential data stored in each of said blocks of data in the block storage device while at the same time said synthetic version of each of said blocks of data having deduplication characteristics of randomness and compressibility that are the same as said predetermined deduplication characteristics of randomness and compressibility of each of said blocks of data in the block storage device.

2. The method of claim 1, further comprising mapping the respective hash values to identifiers for corresponding blocks of data.

3. The method of claim 2, wherein mapping the respective hash values to identifiers for corresponding blocks of data further comprises mapping the respective hash values to the identifiers for the corresponding blocks of data in a same order and frequency as the blocks of data in the block storage device.

4. The method of claim 2, wherein mapping the respective hash values to identifiers for corresponding blocks of data further comprises mapping a same hash value for multiple corresponding blocks of data to identifiers for the multiple corresponding blocks of data as a group.

5. The method of claim 1, further comprising mapping respective hash values to logical block addresses for corresponding blocks of data.

6. The method of claim 1, wherein the block storage device comprises a disc storage device.

7. The method of claim 1, wherein the block storage device comprises a flash array storage device.

8. The method of claim 1, wherein the block storage device comprises a hybrid storage device, incorporating both solid state and disc storage.

9. The method of claim 1, wherein generating the synthetic version of each of said blocks of data using the substituted, shuffled, run lengths further comprises generating a synthetic version of the block storage device using the synthetic version of each of said blocks of data.

10. The method of claim 1, wherein generating the synthetic version of each of said blocks of data using the substituted, shuffled, run lengths further comprises generating the synthetic version of each of said blocks of data having a same entropy value as an entropy value of the blocks of data in the block storage device.

11. The method of claim 1, wherein generating the synthetic version of each of said blocks of data using the substituted, shuffled, run lengths further comprises generating the synthetic version of each of said blocks of data having a same run length histogram as a run length histogram for the blocks of data in the block storage device.

12. The method of claim 1, further comprising creating a run length histogram based on run length values and frequency of run lengths for each of said blocks of data in the block storage device.

13. The method of claim 12, further comprising creating a run length histogram based on run length values and frequency of run lengths for said synthetic version of each of said synthetic blocks of data.

14. The method of claim 13, further comprising comparing the run length histogram for said blocks of data in the block storage device to said run length histogram for said synthetic version of said blocks of data.

15. The method of claim 12, further comprising determining an entropy value for the blocks of data in the block storage device and an entropy value for said synthetic version of said blocks of data.

16. The method of claim 15, further comprising comparing the entropy values for the blocks of data in the block storage device to the entropy value for said synthetic version of said blocks of data.

17. A system comprising:
one or more processors coupled to memory and programmed to:
generate a hash value for each block of data in a block storage device storing confidential data, each of said blocks of data in the block storage device having predetermined deduplication characteristics of randomness and compressibility;
create a random substitution cypher using the respective hash values for each of said blocks of data as seed values to a random number generator;
randomly shuffle positions of run lengths for each of said blocks of data with no run lengths having identical run length values disposed adjacent one another; and
generate a synthetic version of each of said blocks of data using the substituted, shuffled, run lengths, said synthetic version of each of said blocks of data containing no confidential data and only random non-confidential data that is different data than said confidential data stored in each of said blocks of data in the block storage device while at the same time said synthetic version of each of said blocks of data having deduplication characteristics of randomness and compressibility that are the same as said predetermined deduplication characteristics of randomness and compressibility of each of said blocks of data in the block storage device.

* * * * *